A. A. GROVE.
STOCK FEEDING APPARATUS.
APPLICATION FILED JUNE 18, 1917.
1,283,503.
Patented Nov. 5, 1918.
2 SHEETS—SHEET 1.
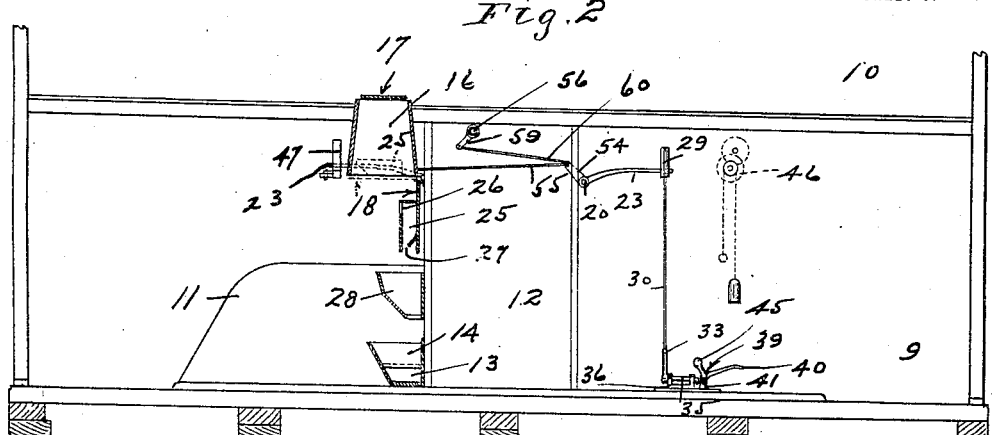
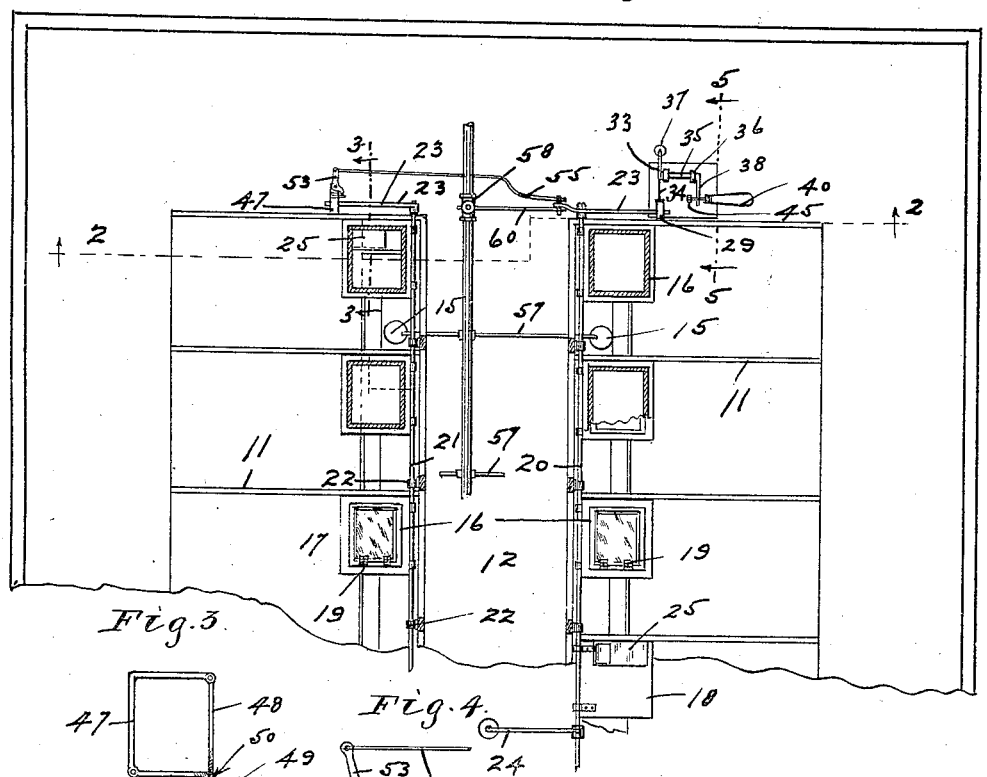
Witnesses
A. H. Opsahl
E. C. Wells
Inventor
Andrew. A. Grove
By his Attorneys
Williamson & Merchant

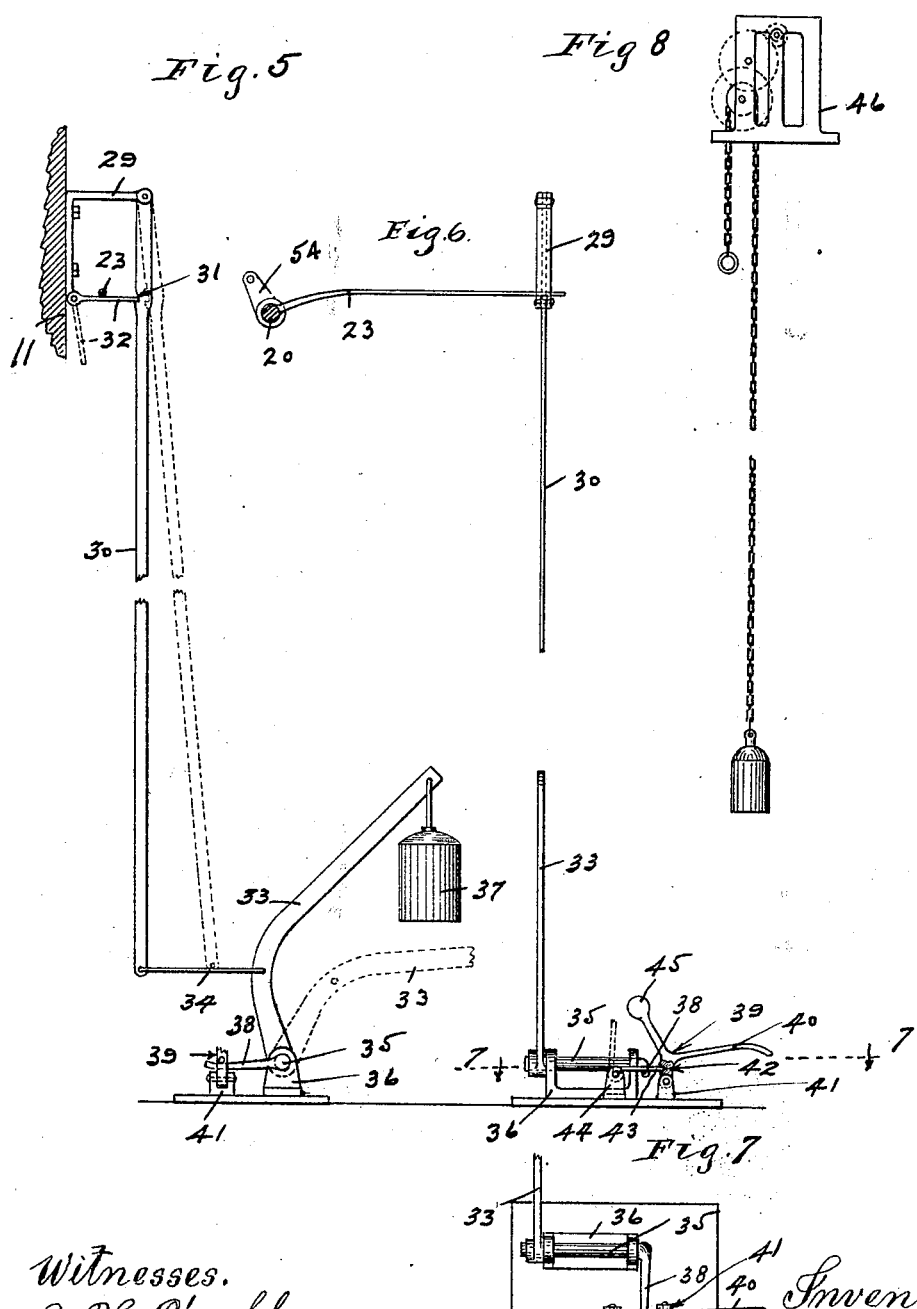

UNITED STATES PATENT OFFICE.

ANDREW A. GROVE, OF MILBANK, SOUTH DAKOTA.

STOCK-FEEDING APPARATUS.

1,283,503.  Specification of Letters Patent.  Patented Nov. 5, 1918.

Application filed June 18, 1917. Serial No. 175,313.

*To all whom it may concern:*

Be it known that I, ANDREW A. GROVE, a citizen of the United States, residing at Milbank, in the county of Grant and State of South Dakota, have invented certain new and useful Improvements in Stock-Feeding Apparatus; and I do hereby declare the following to be a full, clear, and exact description of the invention, such as will enable others skilled in the art to which it appertains to make and use the same.

My invention relates to stock-feeding apparatus; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a fragmentary view, partly in plan and partly in horizontal section, of a barn structure having the invention incorporated therein;

Fig. 2 is a transverse vertical section taken on the irregular line 2—2 of Fig. 1;

Fig. 3 is a detail view, with some parts sectioned on the line 3—3 of Fig. 1, on an enlarged scale;

Fig. 4 is an edge elevation of the parts shown in Fig. 3;

Fig. 5 is a detail view, with some parts sectioned on the line 5—5 of Fig. 1, on an enlarged scale, and with other parts shown in different positions by means of broken lines;

Fig. 6 is a front elevation of the parts shown in Fig. 5;

Fig. 7 is a detail view of certain of the parts shown in Fig. 6, and with some parts thereof sectioned on the line 7—7 of Fig. 6; and Fig. 8 is a side elevation of the weight motor, with some parts diagrammatically illustrated by means of broken lines.

Of the parts of the barn structure shown, it is important to note the lower floor 9, loft 10, and the two rows of stalls 11 which face each other and are spaced to form the wide passageway 12 therebetween. In each stall 11, is a manger 13, having in its left-hand end a feed-box 14 and in its right-hand end a water pail 15.

Supported in each stall 11, over the left-hand end of the manger 13 therein, is a hay-box 16, the upper end of which extends through the floor of the loft 10. This hay-box 16 has converging front and rear walls and an open top and bottom normally closed by a cover 17 and a trap door 18, respectively. The cover 17 is of a size to swing into the hay-box 16 and is hinged thereto at 19 for swinging movement away from the feed-box 14, or, in other words, toward the right-hand end of the manger 13.

All of the trap doors 18, on the right-hand side of the passageway 12, with respect to Fig. 1, are rigidly secured to a hinge rod 20 and all of the trap doors 18, on the other side of said passageway, are rigidly secured to a hinge rod 21. These hinge rods 20 and 21 are journaled in bearings 22 secured to the uprights of the barn structure at the front of the respective rows of stalls 11. On the left-hand end of each hinge rod 20 and 21, is an arm 23 for holding the trap doors 18 closed, and on the other end of each of said rods, is a counterweighted arm 24, provided for preventing the trap doors 18 from opening with too much force.

Secured to the upper face of each trap door 18, is a box-like feed-holding receptacle 25, having in its top a filling opening 26 and also having in one end, to wit: the one at the free end of the trap door 18, a contracted discharge opening 27. Within each stall 11, is an open bottom hopper 28, located between the respective hay-box 16 and manger 13, and arranged to direct the grain or feed from the receptacle 25, when the trap door 18 is swung open, into the feed-box 14.

The following connections are provided for releasably holding the arms 23 with the trap doors 18 closed and for tripping said connections to release said doors. Secured to the outer side of the end stall 11, at the right of the passageway 12, as shown in Fig. 1, is an angle bracket 29. Pivoted to the horizontal member of this bracket 29, is a long depending lever 30, having near its pivoted end a lock notch 31. To the vertical member of the bracket 29, is pivoted a supporting arm 32, arranged to be engaged by the lock notch 31 and supported in a horizontal position.

When the arm 23, at the right of the passageway 12, is raised to hold the respective trap doors 18 closed, the same extends transversely over said arm 32 and is supported thereon. The lever 30 is tripped to release the arm 32, by an upwardly inclined bent lever 33, intermediately connected to the free end of the lever 30 by a link 34. The lever 33 is rigidly secured to one end of a short horizontal rock-shaft 35 journaled in a bearing 36, having a large base plate secured to the floor of the barn structure and has suspended from its free end a weight 37.

Secured to the opposite end of the rock-shaft 35 from the lever 33, is a radially projecting finger 38 held down by a trap 39, against the action of the weight 37. This trap 39 comprises a trigger 40 pivoted to a bearing 41 on the base of the bearing 36 and having a lock notch 42, arranged to receive and hold the free end of a latch 43 pivoted to a bearing 44 also on said base plate.

The free end of the arm 38 extends under the latch 43 and is held thereby, as best shown in Fig. 7. Integral with the trigger 40, is a weighted arm 45 arranged to hold said trigger set with the free end of the latch 43 in the lock notch 42. The trap 39 may be sprung manually or by various different devices, such as shown, for example, a weight-motor 46, with its weight arranged directly above the trigger 40. In raising the weight of the motor 46 to wind said motor, the same may be raised at various different heights, depending on the time at which it is desired to have said weight strike the trigger and spring the trap 39.

Secured to the outside wall of the end stall, on the left of the passageway 12, is an angle bracket 47. Pivoted to the horizontal member of this bracket 47, is a depending arm 48, having its free end bent laterally outward to afford a bearing 49, above which is formed in said member a lock detent 50. To the lower end of the vertical member of the bracket 47, is pivoted an arm 51, having its free end bent laterally and provided with a lock pin 52, arranged to enter the lock detent 50 to releasably hold the arm 51 in a horizontal position. The arm 51 extends transversely of the adjacent arm 23 and holds the same with the respective trap doors closed.

To simultaneously release the trap doors 18, on the left-hand side of the passageway 12, with those on the right-hand side thereof, there is intermediately pivoted to the bearing 49 a lever 53, having its long end attached to a short arm 54 on the hinge rod 20 by a long link 55. The short end of the lever 53 is arranged to engage the laterally bent end on the arm 51, and when the hinge rod 20 is moved to release the respective trap doors 18, forces the arms 48 and 51 apart and thereby releases the lock pin 52 from the lock detent 50. With the arm 51 released, the respective arm 23 is also released thereby and allows the trap doors 18, on the left-hand side of the passageway 12, to open under the action of gravity.

Extending longitudinally through the passageway 12, is an overhead water supply pipe 56, having branch pipes 57 leading, one to each of the water pails 15. Interposed in the water pipe 56, is a normally closed cut-off valve 58, having an arm 59 connected by a link 60 to the arm 54. When the hinge rod 20 is moved to release the trap doors 18, the valve 56 is simultaneously opened by the connections just described and the flow of water from the supply pipe 56, through its branch pipes 57, will fill the water pail 15. The water pipe 56 may lead from any suitable source, not shown, such for instance, as a tank having just enough water to fill all of the water pails 15.

The operation of the stock-feeding apparatus may be briefly described as follows:—

The attendant first closes all of the trap doors 18, by raising the arms 23 and then setting the trap 39, arms 32 and 52 to hold the same. The covers 17 are then raised and the receptacles 25 filled with the desired amount of feed and the boxes 16 filled with hay. The covers 17 are then closed and rest directly upon the hay. The closing movement of the trap doors 18 automatically closes the water cut-off valve 58 through connections previously described. The attendant then pulls on the ring end of the chain of the weight motor 46 to wind said motor and raise the weight thereof to a predetermined height, so that during the unwinding of the motor, said weight will reach the trigger 40 at a predetermined hour. After the weight motor 46 is wound, the attendant may go away and the apparatus does not need any further attention. When the motor 46 has unwound sufficiently to permit its weight to come in contact with the trigger 40, said trigger is depressed thereby, thus releasing the latch 43 which, in turn, releases the arm 38 and permits the weight 37 to move the lever 33 downward. This movement of the lever 33, through the link connection 34, moves the lever 30 sufficiently to release the arm 32 from the lock notch 31 thereof. The releasing of the arm 32, in turn, releases the right-hand arm 23 and permits the respective trap doors 18 to swing open under the action of gravity. The movement of the hinge rod 20, during the opening of the trap doors 18 attached thereto, swings the arm 54 and thereby releases the arm 51, by operating the lever 53, through the link connection 55. The releasing of the arm 51, in turn, releases the held arm 23, which permits the trap doors 18 to swing open under the action of gravity. Simultaneously with the opening of the trap doors 18, the water cut-off valve 58 is opened by connections, as previously described.

When the trap doors swing open, the feed in the receptacle 25 will flow through the open ends thereof and be directed by the hoppers 28 into the feed-boxes 14. The hay in the boxes 16 will also drop into the mangers 13 and, in case the same is inclined to stick in said boxes, will be forced therefrom by the covers 17 swinging into the boxes 16. In case the covers 17 are not heavy enough to force the hay from the boxes 16, the same may be weighted. The downwardly diverging walls of the boxes 16 also assist in the discharging of the hay therefrom. In case it is not convenient to fill the hay-boxes 16 from the loft, the same may have their covers located on one side, so that said boxes may be filled from the passageway 12. By detaching the link 55 from the arm 54, only the trap-doors on the right-hand side of the passageway 12 will be operated, when the trap is sprung. In place of operating the trap 39 from within the barn, the same may be operated by suitable connections extending to the house or other distant point.

From the above description, it is evident that, by the use of the above described apparatus, all of the stock may be fed and watered at the same time and the attendant, after filling the respective receptacles with feed and water, may go away and the stock will be fed and watered at the desired time.

What I claim is:—

1. The combination with a barn structure having a stall provided with a manger and a feed-box, of a hay-box located over the manger and having an open bottom, a trap door for closing the open bottom of the hay-box, means for holding the trap door closed and for releasing the same, a feed receptacle carried by the trap door and having an opening arranged when the trap door is open to discharge the contents therein into the feed-box, and a hopper arranged to direct the materials discharged from the feed receptacle into the feed-box.

2. The combination with a barn structure having a stall provided with a manger and a feed-box, of a hay-box located over the manger and having an open bottom, a trap door for closing the open bottom of the hay-box, means for holding the trap door closed and for releasing the same, and a feed receptacle carried by the trap door and having an opening arranged when the trap door is open to discharge the contents therein into the feed-box.

In testimony whereof I affix my signature in presence of two witnesses.

ANDREW A. GROVE.

Witnesses:
  FRANK BOERGER,
  C. E. MILLS.